United States Patent
Brevick et al.

(10) Patent No.: US 9,541,158 B2
(45) Date of Patent: Jan. 10, 2017

(54) STAMPED STEEL PENDULUM AND PENDULUM CARRIER FOR CRANKSHAFT

(71) Applicant: Ford Global Technologies, LLC, Dearborn, MI (US)

(72) Inventors: John Edward Brevick, Livonia, MI (US); Jeffrey Eliot Chottiner, Farmington Hills, MI (US); Rick L. Williams, Canton, MI (US); Michael A. Kopmanis, Monroe, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/663,322

(22) Filed: Mar. 19, 2015

(65) Prior Publication Data

US 2016/0273615 A1   Sep. 22, 2016

(51) Int. Cl.
*F16F 15/28*   (2006.01)

(52) U.S. Cl.
CPC .................... *F16F 15/283* (2013.01)

(58) Field of Classification Search
CPC ........ F16F 15/283; F16F 15/262; F16F 15/14; F16F 15/145; F16F 15/264; F16C 3/06; F16C 3/20; Y10T 74/2183; Y10T 74/2174
See application file for complete search history.

(56) References Cited

U.S. PATENT DOCUMENTS

| 2,496,836 | A * | 2/1950 | Williams | F16F 15/14 74/604 |
|---|---|---|---|---|
| 8,813,604 | B2 * | 8/2014 | Geist | F16F 15/145 123/192.2 |
| 8,813,605 | B2 * | 8/2014 | Wakeman | F16C 3/20 123/192.2 |
| 2014/0305258 | A1 * | 10/2014 | Bertram | F16F 15/30 74/574.2 |
| 2015/0047461 | A1 * | 2/2015 | Glanfield | F16C 3/20 74/604 |
| 2015/0285333 | A1 * | 10/2015 | Brevick | F16F 15/26 123/192.2 |
| 2016/0010720 | A1 * | 1/2016 | Brevick | F16F 15/145 123/192.1 |

* cited by examiner

*Primary Examiner* — Adam D Rogers
(74) *Attorney, Agent, or Firm* — LeClairRyan

(57) ABSTRACT

A pendulum assembly comprises a cold forged steel pendulum or cold formed steel pendulum attached to a cold forged steel carrier or cold formed steel carrier. The carrier is attached to the crankshaft. The pendulum assembly includes a first outer steel plate, a second outer steel plate, and an intermediate steel plate. The stamped plates are formed from flat sheet steel to provide the pendulum shape and features. The outer steel plates are attached to the intermediate steel plate by any of a variety of methods. The pendulum carrier of the disclosed inventive concept is comprised of one or more steel plates that are also cold forged or cold formed from steel to provide the pendulum carrier shape and features. Alternatively, the pendulum carrier may include two cold forged or cold formed portions attached together or three cold forged or cold formed portions attached together.

17 Claims, 4 Drawing Sheets

STAMPED STEEL PENDULUM AND PENDULUM CARRIER FOR CRANKSHAFT

TECHNICAL FIELD

The disclosed inventive concept relates generally to pendulums and pendulum carriers for crankshafts for internal combustion engines. More particularly, the disclosed inventive concept relates to stamped steel pendulums and pendulum carriers and methods of attachment.

BACKGROUND OF THE INVENTION

Internal combustion engines having a relatively small number of cylinders provide automobile makers with an attractive solution to the need for improved fuel economy. In order to compensate for reduction of cubic capacity vehicle manufacturers developed technologies to improve engine power, such as direct fuel injection, turbocharging, and variable timing for inlet and exhaust camshafts. In this way six- and eight-cylinder engines can be scaled down without losing available horsepower.

An undesirable consequence of engines with a small number of cylinders is high crankshaft torsional vibration that is transmitted to the engine mounts and to the drive line. This results in higher seat track and steering wheel NVH as well as gear rattle.

Engineers manage these vibrations to one extent or another through a variety of approaches, many of which increase the cost of construction but reduce fuel economy. One accepted solution to overcome excessive vibration is the provision of one or more pendulums on the crankshaft to lower the torsional vibration of the crankshaft and the consequent vehicle noise and harshness. Such crankshaft-mounted pendulums function as vibration absorbers as they are tuned to address and thus reduce vibrations generated by oscillating torque, thus smoothing torque output of the crankshafts. This approach is taken as well by designers of some airplane piston engines where the pendulums smooth output torque and reduce the stress of the rotors.

An example of a pendulum vibration absorber associated with an engine crankshaft is set forth in U.S. Pat. No. 4,739,679, assigned to the assignee of the instant application. According to the arrangement set forth in this patent, a pendulum includes an inner curved cam follower surface that is alternately engaged and disengaged from a pin type cam fixed on the pendulum carrier.

The crankshaft pendulum and pendulum carrier used today are expensive to manufacture due to both material cost and machining cost. They must be made of steel for durability and, thus, are formed from hot forgings. Conventional pendulums include two such steel forgings that are bolted together. The individual steel forgings must be machined before assembly. The high cost of known pendulums and their associated carriers serve as a financial impediment to the wide-spread use of pendulums on crankshafts.

Thus a new approach to the pendulum crankshafts and their associated carriers is needed to address the problems associated with known arrangements.

SUMMARY OF THE INVENTION

The disclosed inventive concept overcomes the challenges faced by known pendulum crankshaft arrangements for internal combustion engines by providing a pendulum and pendulum carrier constructed of cold forged or cold formed steel components that are attached by any one of a variety of methods.

The pendulum includes a first outer plate, a second outer plate, and an intermediate plate. The plates may be constructed from cold forged or cold formed steel. The plates may be formed from flat sheet steel to provide the pendulum shape and features. The first and second outer plates are then machined to form cycloid pathways for cycloid rolling pins. The outer plates are attached to the intermediate plate by any of a variety of methods including, for example, mechanical fastening or welding.

The pendulum carrier of the disclosed inventive concept is comprised of one or more plates formed from cold forged or cold formed steel. The plates may be formed by stamping flat sheet steel to provide the pendulum carrier shape and features. The cycloid pathways are then formed by machining. If a single plate, the plate is bent along two fold lines to provide a support for the pendulum. Alternatively, the pendulum carrier may include two portions attached together or three portions attached together, the portions being formed from cold forged or cold formed steel. Attachment may also be accomplished by mechanical fastening or by welding.

The pendulum and pendulum carrier of the disclosed inventive concept provide a practical and cost-saving alternative to known hot forged pendulum assemblies and hot forged pendulum carriers. The cold forged or cold formed steel components of the disclosed inventive concept require only machining of the cycloid pathways as opposed to the requirement that several machining steps are required when such assemblies are produced from hot forging.

The above advantages and other advantages and features will be readily apparent from the following detailed description of the preferred embodiments when taken in connection with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention wherein.

DETAILED DESCRIPTION OF THE PREFERRED EMBODIMENT

Figure 1:
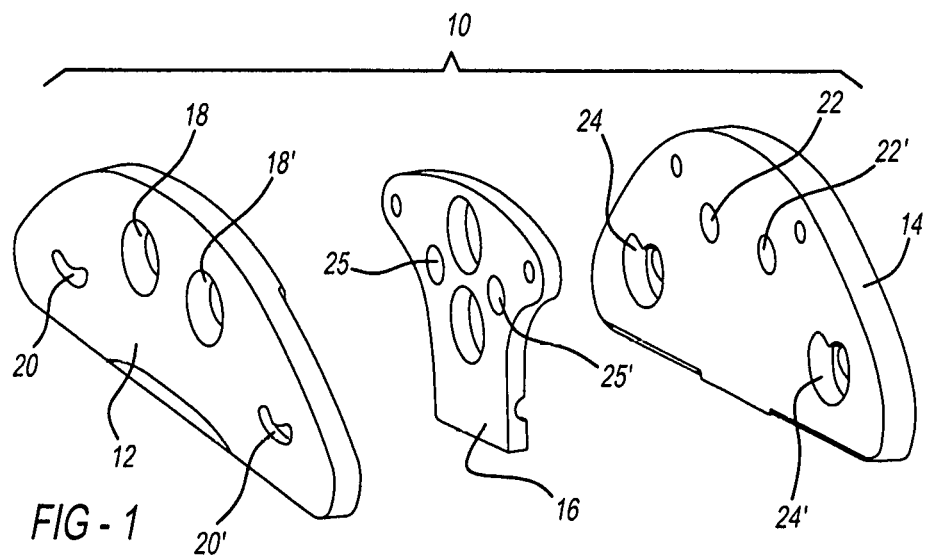
FIG. 1 is an exploded view of the components of a pendulum assembly according to a first embodiment the disclosed inventive concept.

In the following figures, the same reference numerals will be used to refer to the same components. In the following description, various operating parameters and components are described for different constructed embodiments. These specific parameters and components are included as examples and are not meant to be limiting.

Figure 2:
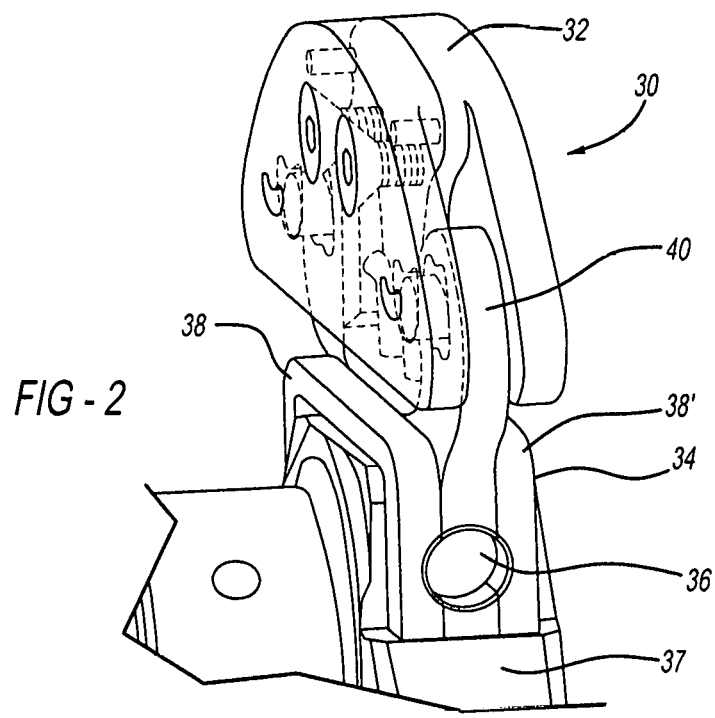
FIG. 2 is a perspective view of a stamped pendulum carrier and method of attachment to the crankshaft according to a second embodiment of the stamped pendulum carrier of the disclosed inventive concept.
Figure 3:
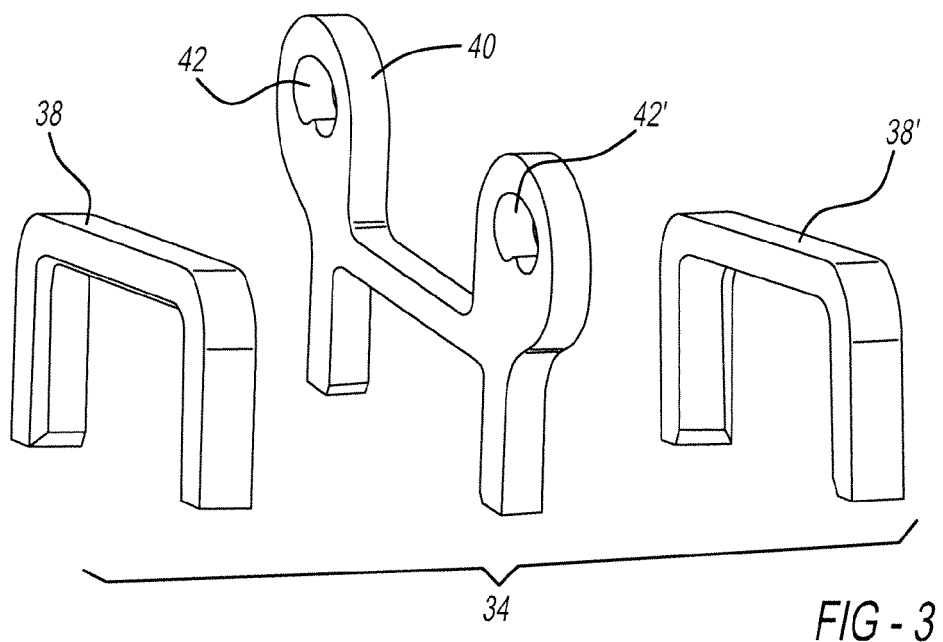
FIG. 3 is an exploded view of the carrier of FIG. 2.
Figure 4:
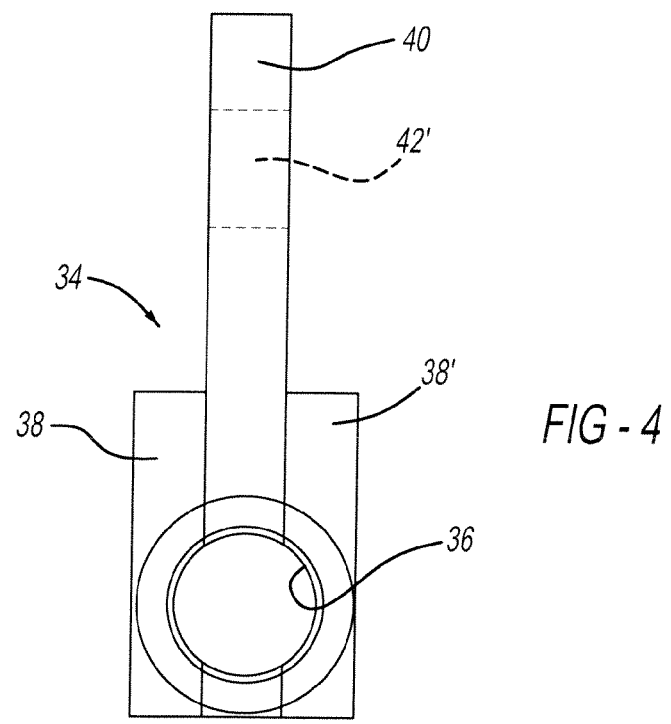
FIG. 4 is an end view of the carrier of FIG. 2.
Figure 5:
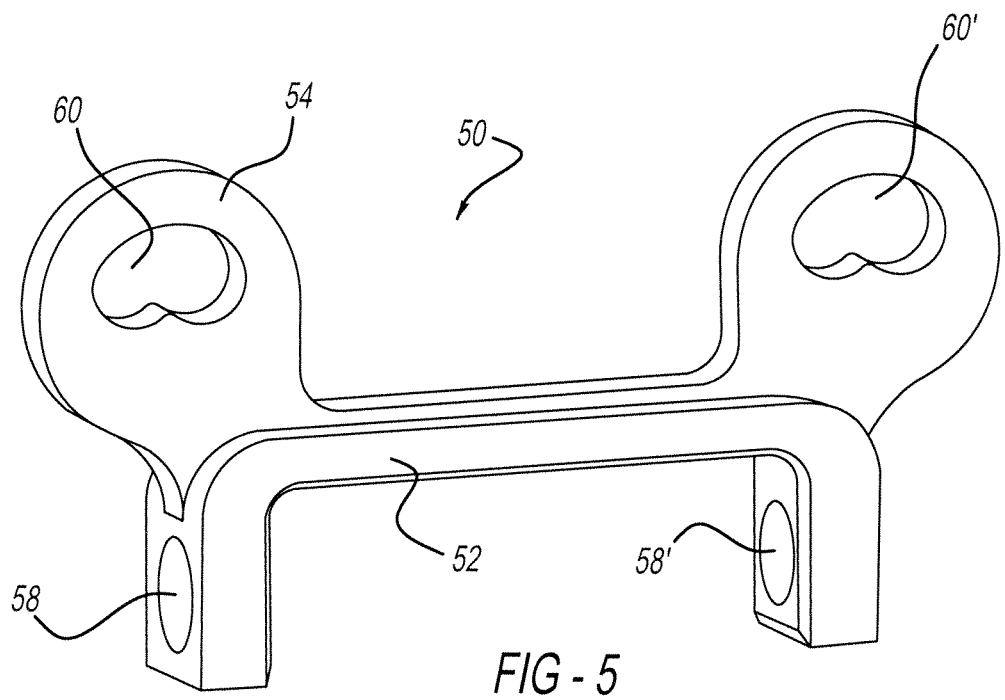
FIG. 5 is a perspective view of a stamped pendulum carrier according to a third embodiment of the stamped pendulum carrier of the disclosed inventive concept.
Figure 6:
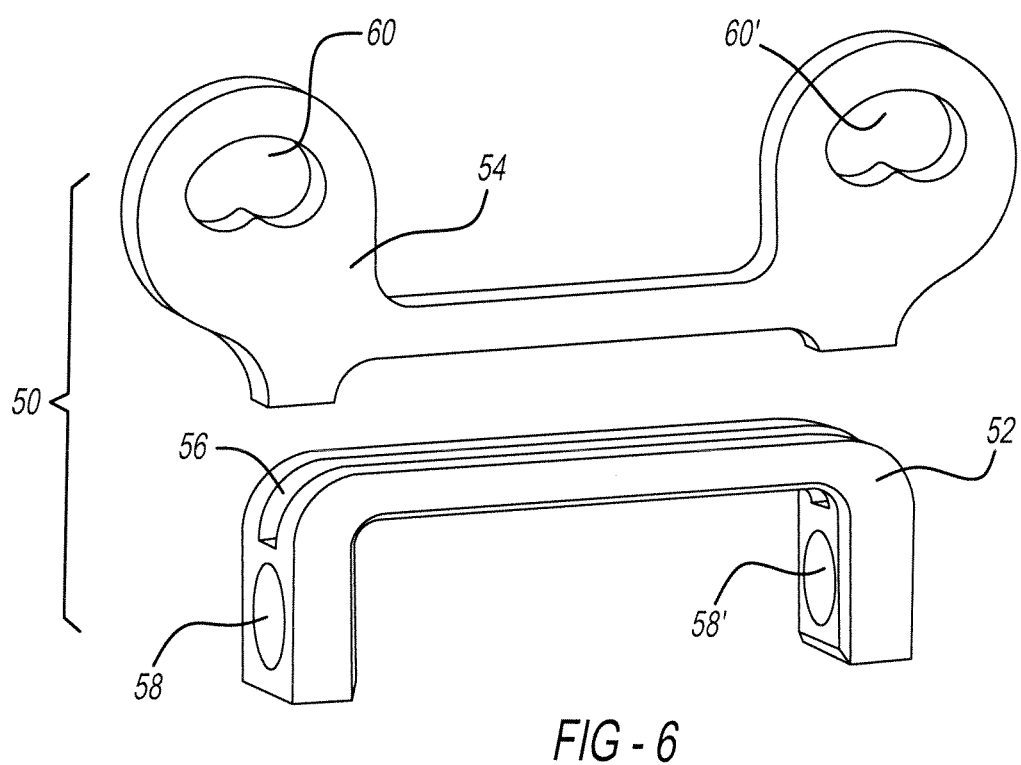
FIG. 6 is an exploded view of the pendulum carrier of FIG. 5.
Figure 7:
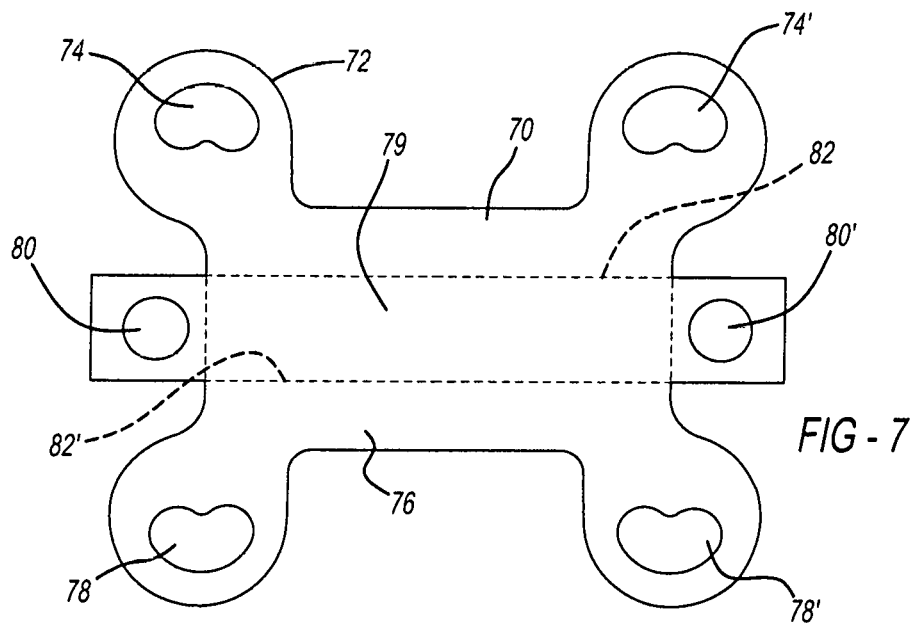
FIG. 7 is a plan view of a stamped pendulum carrier according to a fourth embodiment of the stamped pendulum carrier of the disclosed inventive concept.
Figure 8:
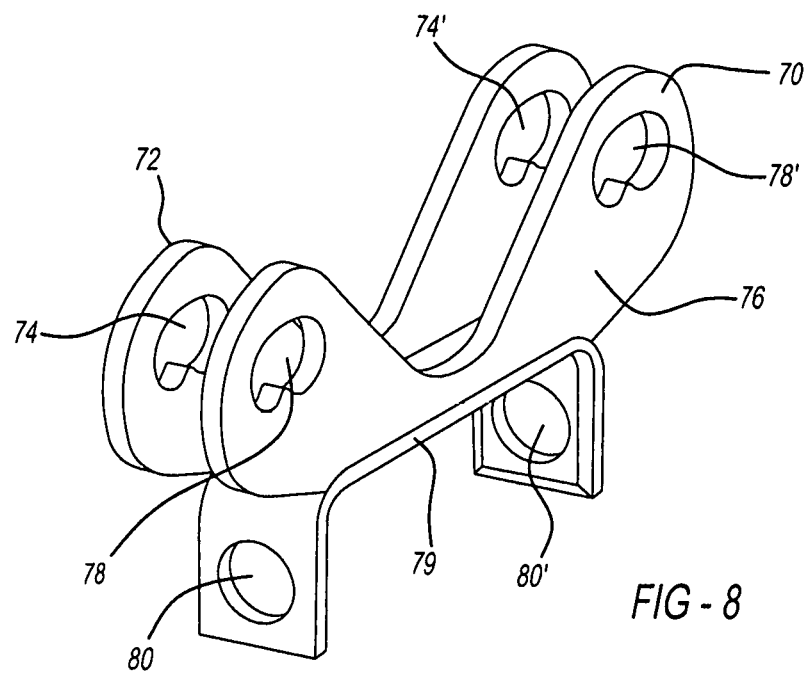
FIG. 8 is a perspective view of the stamped pendulum carrier of FIG. 7 in which its sides have been folded to their functional positions.

Referring to FIG. 1, a view of a pendulum assembly according to the disclosed inventive concept is illustrated. Referring to FIGS. 2 through 4, a second embodiment of a pendulum and pendulum carrier and method of attaching the pendulum carrier to the crankshaft according to the disclosed inventive concept is illustrated. Referring to FIGS. 5 and 6, a third embodiment of a pendulum carrier according to the disclosed inventive concept is illustrated. Referring to FIGS. 7 and 8, a fourth embodiment of a pendulum carrier according to the disclosed inventive concept is illustrated.

FIGS. 1 through 8 disclose the pendulum and pendulum carrier according to the disclosed inventive concept. The pendulums and pendulum carriers as illustrated and described provide improvements over the prior art in both production cost and performance.

FIG. 1 is an exploded view of the components of a pendulum assembly, generally illustrated as 10, according to the disclosed inventive concept. The pendulum assembly 10 includes a pendulum flat stamped half 12, a pendulum flat stamped half 14, and an intermediate flat stamped spacer 16. A pair of fastener holes 18 and 18' for bolts or rivets is formed in the pendulum flat stamping half 12. The fastener holes 18 and 18' may be left out and the flat stamping halves may be attached by welding instead. A pair of kidney-shaped cycloid pathways 20 and 20' is formed by machining in the pendulum flat stamping half 12. A pair of fastener holes 22 and 22' for bolts or rivets is formed in the pendulum second stamping half 14. The fastener holes 22 and 22' may be left out and the flat stamping halves may be attached by welding instead. A pair of kidney-shaped cycloid pathways 24 and 24' is formed by machining in the pendulum flat stamping half 14. A pair of fastener holes 25 and 25' is formed in the intermediate flat stamped spacer 16. Stamping of the pendulum flat stamped half 12, the pendulum flat stamped half 14, and the intermediate flat stamped spacer 16 provides shape and features. While the kidney-shaped cycloid pathways 20, 20', 24 and 24' must be formed by machining after stamping, the use of stamped components avoids the need to machine other surfaces, providing an important advantage over the prior art.

Mechanical fasteners such as rivets are used to fasten the pendulum flat stamped half 12, the pendulum flat stamped half 14, and the intermediate flat stamped spacer 16 together. Other mechanical fasteners or welding may be used in the alternative.

In addition to the pendulum assembly 10 being formed from stamped components, the disclosed inventive concept provides that the pendulum carrier, used to attach the pendulum assembly 10 to the crankshaft, is to preferably be formed from stamped components as well. Variations of a carrier formed from cold forged or cold formed steel are illustrated in FIGS. 2 through 4.

Referring to FIGS. 2 through 4, a second embodiment of a pendulum and pendulum carrier according to the disclosed inventive concept is illustrated. FIG. 2 illustrates a perspective view of a pendulum assembly, generally illustrated as 30, which includes a pendulum 32 and a pendulum carrier assembly 34. The pendulum 32 may be of the prior art type or may be of the cold forged or cold formed steel type as disclosed herein.

The carrier assembly 34 includes a fastener hole 36 for receiving a fastener such as a shoulder bolt (not shown) to a crankshaft 37. The carrier assembly 34 further includes a first u-shaped stamped carrier shoulder plate 38, a second u-shaped stamped carrier shoulder plate 38', and a central stamped carrier plate 40 fitted between said first and second stamped carrier shoulder plates 38 and 38'. The u-shaped stamped carrier shoulder plates 38 and 38' and the central stamped carrier plate 40 may be attached to each other by a variety of ways, including but not limited to mechanical fastening, welding, pressing and pinning. Kidney-shaped cycloid pathways 42 and 42' are formed through the central carrier plate 40. No forging or machining of the perimeter are required in this embodiment of the carrier, unlike the carrier of the prior art.

Referring to FIGS. 5 and 6, a third embodiment of a pendulum and pendulum carrier according to the disclosed inventive concept is illustrated. In this embodiment, a pendulum carrier assembly, generally illustrated as 50, includes a stamped crankshaft attachment bracket 52 and a stamped pendulum carrier attachment bracket 54. The crankshaft attachment bracket 52 includes a pendulum carrier attachment bracket channel 56 and a pair of fastener holes 58 and 58' for receiving a fastener such as a shoulder bolt (not shown) for attaching the crankshaft attachment bracket 52 to the crankshaft (not shown).

The stamped pendulum carrier attachment bracket 54 and the crankshaft attachment bracket 52 may be attached to each other by a variety of ways, including but not limited to mechanical fastening, welding, pressing and pinning. Kidney-shaped cycloid pathways 60 and 60' are formed through the stamped pendulum carrier attachment bracket 54. The pendulum (not shown) which is attached to the pendulum carrier assembly 50 may be of the prior art type or may be of the cold forged or cold formed steel type as disclosed herein. No forging or machining of the perimeter are required in this embodiment of the carrier, unlike the carrier of the prior art.

Referring to FIGS. 7 and 8, a fourth embodiment of a pendulum and pendulum carrier according to the disclosed inventive concept is illustrated. In this embodiment, a one-piece, stamped pendulum carrier 70 replaces the multi-pieced carrier discussed above and is thus less costly to manufacture. The one-piece, stamped pendulum carrier 70 includes a first carrier wall 72 in which are formed kidney-shaped, cycloid pathways 74 and 74' and a second carrier wall 76 in which are formed kidney-shaped cycloid pathways 78 and 78'. A base wall 79 is provided between the first carrier wall 72 and the second carrier wall 76. A pair of fastener attachment holes 80 and 80' is provided for receiving a fastener such as a shoulder bolt (not shown) for attaching the one-piece, stamped pendulum carrier to the crankshaft (not shown).

Upon initial stamping, the one-piece, stamped pendulum carrier 60 is flat. The first carrier wall 72 and the second carrier wall 76 are bent about 90° relative to the base wall 79 along fold lines 82 and 82'. The pendulum (not shown) which is attached to the one-piece, stamped pendulum carrier 70 may be of the prior art type or may be of the cold forged or cold formed steel type as disclosed herein. No forging or machining of the perimeter are required in this embodiment of the carrier, unlike the carrier of the prior art.

The stampings of the pendulum and pendulum carrier discussed above may be made from any of a variety of suitable materials, although steel is preferred for strength and wear resistance. The stampings may be made by laser cutting or water jet cutting. In addition, the stamping may be formed by wire EDM. In addition to being produced from stampings, the components used as stamped components may be made by cold forging or cold forming.

The stamped components of the pendulum and pendulum carrier as described above may be attached by any of several means, including, but not limited to mechanical fastening (using bolts, pressed pins, staked pins, mushroomed pins), welding (laser, spot), or may be mechanically joined by techniques such as sliding or dovetail joining.

The disclosed inventive concept as set forth above overcomes the challenges faced by known pendulum crankshaft arrangements for internal combustion engines by an economical and easy to manufacture approach to both pendulums and the joining of pendulums to crankshafts. By replacing hot forged components with cold forged or cold formed steel ones, both material and manufacturing costs can be reduced. Accordingly, one skilled in the art will readily recognize from such discussion, and from the accompanying drawings and claims that various changes, modifications and variations can be made therein without departing from the true spirit and fair scope of the invention as defined by the following claims.

What is claimed is:

1. A pendulum assembly for a crankshaft comprising:
a pendulum consisting of at least three parts; and
a pendulum carrier to which said pendulum is attached, said pendulum carrier being attached to the crankshaft, at least one of said pendulum or said pendulum carrier being formed from a group consisting of cold forged and cold formed material, said carrier including a carrier support into which said carrier is inserted, a portion of said carrier extending out of said support.

2. The pendulum assembly for a crankshaft of claim 1, wherein said three parts of said pendulum include two carrier shoulders and an intermediate carrier center captured between said carrier shoulders.

3. The pendulum assembly for a crankshaft of claim 2, wherein said carrier shoulders are formed from the group consisting of cold forged steel and cold formed steel.

4. The pendulum assembly for a crankshaft of claim 3, wherein said carrier shoulders have kidney-shaped cycloid pathways formed therein.

5. The pendulum assembly for a crankshaft of claim 3, wherein said intermediate carrier center is formed from the group consisting of cold forged steel and cold formed steel.

6. The pendulum assembly for a crankshaft of claim 1, wherein said pendulum carrier is formed from a single piece of stamped and folded steel.

7. The pendulum assembly for a crankshaft of claim 1, wherein said pendulum carrier includes a carrier center to which said pendulum is attached.

8. The pendulum assembly for a crankshaft of claim 7, wherein said carrier support is U-shaped.

9. The pendulum assembly for a crankshaft of claim 8, wherein said carrier center has kidney-shaped cycloid pathways formed therein.

10. A pendulum crankshaft assembly for an internal combustion engine comprising:
a crankshaft;
a pendulum consisting of at least three parts; and
a pendulum carrier to which said pendulum is attached, said pendulum carrier being attached to the crankshaft, at least one of said pendulum or said pendulum carrier being formed from a group consisting of cold forged and cold formed material, each of said pendulum and said pendulum carrier having kidney-shaped cycloid pathways formed therein, said carrier including a carrier support into which said carrier is inserted, a portion of said carrier extending out of said support.

11. The pendulum crankshaft assembly of claim 10, wherein said three parts of said pendulum include two carrier shoulders and an intermediate carrier center captured between said carrier shoulders.

12. The pendulum crankshaft assembly of claim 11, wherein said carrier shoulders are formed from the group consisting of cold forged steel and cold formed steel.

13. The pendulum crankshaft assembly of claim 12, wherein said intermediate carrier center is formed from the group consisting of cold forged steel and cold formed steel.

14. The pendulum crankshaft assembly of claim 10, wherein said pendulum carrier is formed from a single piece of stamped and folded steel.

15. The pendulum crankshaft assembly of claim 10, wherein said pendulum carrier includes a carrier center to which said pendulum is attached.

16. The pendulum crankshaft assembly of claim 15, wherein said carrier support is U-shaped.

17. A pendulum assembly for a crankshaft comprising:
a pendulum consisting of at least three parts, each of said parts being formed from a group consisting of cold forged and cold formed material; and
a pendulum carrier to which said pendulum is attached, said pendulum carrier being attached to the crankshaft, said pendulum carrier being at least one piece, said at least one piece being formed from a cold forged or cold formed material.

* * * * *